US009813120B2

(12) United States Patent
Ou et al.

(10) Patent No.: US 9,813,120 B2
(45) Date of Patent: Nov. 7, 2017

(54) BASE STATION, AND METHOD AND DEVICE FOR RETURNING SIGNAL

(71) Applicant: Huawei Technologies Co., Ltd., Shenzhen (CN)

(72) Inventors: Jian Ou, Shenzhen (CN); Yungang Li, Ottawa (CA); Ganghua Yang, Boulogne Billancourt (FR); Yi Wang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 219 days.

(21) Appl. No.: 14/719,028

(22) Filed: May 21, 2015

(65) Prior Publication Data

US 2015/0256233 A1 Sep. 10, 2015

Related U.S. Application Data

(63) Continuation of application No. PCT/CN2013/076214, filed on May 24, 2013.

(30) Foreign Application Priority Data

Nov. 21, 2012 (CN) .......................... 2012 1 0475372

(51) Int. Cl.
*H04W 72/00* (2009.01)
*H04B 7/022* (2017.01)
(Continued)

(52) U.S. Cl.
CPC .............. *H04B 7/022* (2013.01); *H04B 7/15* (2013.01); *H04W 72/0453* (2013.01); *H04W 88/085* (2013.01)

(58) Field of Classification Search
CPC ........................ H04W 72/0453; H04W 88/085
(Continued)

(56) References Cited

U.S. PATENT DOCUMENTS

| 5,859,842 A | 1/1999 | Scott |
| 7,715,466 B1 | 5/2010 | Oh et al. |

(Continued)

FOREIGN PATENT DOCUMENTS

| CN | 101183900 A | 5/2008 |
| CN | 101772047 A | 7/2010 |

(Continued)

OTHER PUBLICATIONS

Foreign Communication From a Counterpart Application, European Application No. 13856286.3, Extended European Search Report dated Nov. 12, 2015, 10 pages.

(Continued)

*Primary Examiner* — Joseph Arevalo
(74) *Attorney, Agent, or Firm* — Conley Rose, P.C.

(57) ABSTRACT

A method for returning a base station signal and a base station for implementing the method. The base station includes a first return unit located in a radio frequency system and a second return unit located in a baseband processing system. The first return unit is configured to perform analog modulation on an uplink analog signal of a first bandwidth to obtain an uplink analog signal of a second bandwidth, and send the uplink analog signal of the second bandwidth to the second return unit, where the second bandwidth is larger than the first bandwidth. The second return unit is configured to receive the uplink analog signal of the second bandwidth, demodulate the uplink analog signal of the second bandwidth to obtain the uplink analog signal of the first bandwidth.

17 Claims, 3 Drawing Sheets

(51) Int. Cl.
*H04W 72/04* (2009.01)
*H04B 7/15* (2006.01)
*H04W 88/08* (2009.01)

(58) Field of Classification Search
USPC .................. 455/561, 452.1, 517, 196.1, 78
See application file for complete search history.

(56) References Cited

U.S. PATENT DOCUMENTS

| | | | | |
|---|---|---|---|---|
| 7,808,884 | B2* | 10/2010 | Jitsukawa | ............ H04L 5/0044 370/208 |
| 8,634,372 | B2* | 1/2014 | Jitsukawa | ............ H04L 5/0044 370/330 |
| 2002/0187809 | A1 | 12/2002 | Mani et al. | |
| 2006/0172781 | A1 | 8/2006 | Mohebbi | |
| 2008/0101214 | A1* | 5/2008 | Jitsukawa | ............ H04L 5/0044 370/208 |
| 2011/0013585 | A1* | 1/2011 | Jitsukawa | ............ H04L 5/0044 370/330 |

FOREIGN PATENT DOCUMENTS

| | | |
|---|---|---|
| RU | 2387075 C2 | 4/2010 |
| WO | 9816054 A1 | 4/1998 |
| WO | 2010011272 A1 | 1/2010 |
| WO | WO 2010011272 A1 * | 1/2010 ............... H03L 7/23 |

OTHER PUBLICATIONS

Foreign Communication From a Counterpart Application, PCT Application No. PCT/CN2013/076214, English Translation of International Search Report dated Aug. 15, 2013, 2 pages.
Foreign Communication From a Counterpart Application, PCT Application No. PCT/CN2013/076214, English Translation of Written Opinion dated Aug. 15, 2013, 10 pages.
Foreign Communication From a Counterpart Application, Russian Application No. 2015124030, Russian Notice of Allowance dated Nov. 29, 2016, 21 pages.
Foreign Communication From a Counterpart Application, European Application No. 13856286.3, European Office Action dated May 8, 2017, 7 pages.

* cited by examiner

BASE STATION, AND METHOD AND DEVICE FOR RETURNING SIGNAL

CROSS-REFERENCE TO RELATED APPLICATIONS

This application is a continuation of International Application No. PCT/CN2013/076214, filed on May 24, 2013, which claims priority to Chinese Patent Application No 201210475372.0, filed on Nov. 21, 2012, both of which are hereby incorporated by reference in their entireties.

TECHNICAL FIELD

Embodiments of the present invention relate to communications technologies, and in particular, to a method for returning a base station signal and a base station.

BACKGROUND

When a system such as a wireless base station is deployed, a return system needs to be adopted to connect a signal of the base station to a network system. Common return systems include systems such as a wired data cable, an optical fiber, and a wireless microwave. Different return solutions are adopted according to different application scenarios, data rates, and resource conditions.

As base stations are deployed more densely and in many scenarios where wired and optical fiber resources are unavailable, wireless microwave return becomes a major means to a base station return system, and a base station can be rapidly deployed and enabled through a wireless microwave return system. In a conventional microwave return system, a complicated signal processing process involves base station digital processing from an air interface of a base station to an intermediate radio frequency of the base station, modem digital signal processing of the microwave return system, and intermediate radio frequency processing of an outdoor unit (ODU), and analog-to-digital conversion/digital-to-analog conversion needs to be performed twice, thereby causing a series of problems such as high hardware cost, large board size, high power consumption, and high maintenance cost.

SUMMARY

Embodiments of the present invention disclose a method for returning a base station signal so that a base station analog signal is directly modulated/demodulated to reduce complexity of a signal returning process.

In a first aspect, an embodiment of the present invention discloses a distributed base station, where the distributed base station includes a radio frequency system and a baseband processing system, the radio frequency system includes a radio frequency processing unit and a first return unit, the baseband processing system includes a baseband processing unit and a second return unit, where the radio frequency processing unit is configured to generate an uplink analog signal of a first bandwidth; the first return unit is configured to perform analog modulation on the uplink analog signal of the first bandwidth generated by the radio frequency processing unit, to obtain an uplink analog signal of a second bandwidth; and send the uplink analog signal of the second bandwidth to the second return unit, wherein the second bandwidth is larger than the first bandwidth; the second return unit is configured to receive the uplink analog signal of the second bandwidth sent by the first return unit, and demodulate the uplink analog signal of the second bandwidth to obtain the uplink analog signal of the first bandwidth; and the baseband processing unit is configured to perform baseband processing on the uplink analog signal of the first bandwidth and send the baseband-processed uplink analog signal of the first bandwidth to a core network.

As an implementation manner of the first aspect, the second return unit is further configured to modulate a downlink analog signal of a third bandwidth to obtain a downlink analog signal of a fourth bandwidth, where the downlink analog signal of the third bandwidth has been processed by the baseband processing system; and send the downlink analog signal of the fourth bandwidth to the first return unit, where the fourth bandwidth is larger than the third bandwidth. The first return unit is further configured to demodulate the downlink analog signal of the fourth bandwidth to obtain the downlink analog signal of the third bandwidth, and send the downlink analog signal of the third bandwidth to a user through the radio frequency system.

Further, as an implementation manner of the first aspect, the first return unit is specifically configured to perform analog modulation on one or multiple uplink analog signals of the first bandwidth to obtain one uplink analog signal of the second bandwidth. The first return unit may send the uplink analog signal of the second bandwidth to the second return unit in a wired or wireless manner.

In a second aspect, an embodiment of the present invention provides a method for returning a base station signal by using an analog signal, and the method includes: receiving, by a first return unit, an uplink analog signal, where a bandwidth of the uplink analog signal is a first bandwidth; performing, by the first return unit, analog modulation on the uplink analog signal of the first bandwidth to obtain an uplink analog signal of a second bandwidth, where the second bandwidth is larger than the first bandwidth; and sending, by the first return unit, the uplink analog signal of the second bandwidth to a second return unit, where the uplink analog signal of the second bandwidth is demodulated by the second return unit to the uplink analog signal of the first bandwidth and then the uplink analog signal of the first bandwidth is sent to a core network.

As an implementation manner, the first return unit performs analog modulation on multiple uplink analog signals of the first bandwidth to obtain one uplink analog signal of the second bandwidth.

Further, when the uplink analog signal is an intermediate frequency or baseband analog signal: the performing, by the first return unit, analog modulation on the uplink analog signal of the first bandwidth to obtain an analog signal of a second bandwidth includes: performing, by the first return unit, analog modulation on the intermediate frequency or baseband analog signal of the first bandwidth to obtain an intermediate frequency or baseband analog signal of the second bandwidth.

In a third aspect, an embodiment of the present invention provides a radio frequency processing device of a distributed base station, and the radio frequency processing device includes an antenna system, and further includes: a base station analog radio frequency circuit configured to generate an uplink analog signal of a first bandwidth; and an analog conversion circuit, connected to the analog radio frequency circuit and configured to perform analog modulation on the uplink analog signal of the first bandwidth to obtain an uplink analog signal of a second bandwidth, where the second bandwidth is larger than the first bandwidth after conversion is performed by the analog conversion circuit, where the analog conversion circuit is coupled to the antenna system, the antenna system sends the analog signal of the second bandwidth to a baseband processing device, and the uplink analog signal of the second bandwidth is demodulated by the baseband processing device to the base station analog signal of the first bandwidth and then the base station analog signal of the first bandwidth is sent to a core network.

As an implementation manner, the analog conversion circuit includes: a sampler configured to periodically sample the uplink analog signal of the first bandwidth to obtain a sampled signal; a spread spectrum sequence generator configured to generate a group of spread spectrum sequences, where the group of spread spectrum sequences belongs to an orthogonal spread spectrum sequence group; and a mixer configured to multiply the sampled signal by the spread spectrum sequence to obtain the uplink analog signal of the second bandwidth.

As another specific implementation manner of the third aspect of the embodiment, the analog conversion circuit is specifically configured to perform analog modulation on multiple uplink analog signals of the first bandwidth to obtain one uplink analog signal of the second bandwidth; and the first return unit sends the one uplink analog signal of the second bandwidth to a second return unit, where the one uplink analog signal of the second bandwidth is demodulated by the second return unit to the multiple base station analog signals of the first bandwidth, and the multiple base station analog signals of the first bandwidth are sent to the core network.

In a fourth aspect, an embodiment of the present invention provides a method for returning a base station signal by using an analog signal, and the method includes: receiving, by a second return unit, an uplink analog signal of a second bandwidth, where the uplink analog signal of the second bandwidth is sent by a first return unit, the uplink analog signal of the second bandwidth is obtained after the first return unit modulates an uplink analog signal of a first bandwidth, and the second bandwidth is larger than the first bandwidth; and demodulating, by the second return unit, the uplink analog signal of the second bandwidth to obtain the uplink analog signal of the first bandwidth, where after undergoing baseband processing, the uplink analog signal of the first bandwidth is sent to a core network.

As an implementation manner, the second return unit demodulates the uplink analog signal of the second bandwidth to obtain multiple uplink analog signals of the first bandwidth.

In a fifth aspect, an embodiment of the present invention provides a baseband processing device of a distributed base station, and the device includes an antenna system and further includes: a receiving circuit, coupled to an antenna and configured to receive an uplink analog signal of a second bandwidth, where the uplink analog signal of the second bandwidth is sent by a first return unit, the uplink analog signal of the second bandwidth is obtained after the first return unit modulates an uplink analog signal of a first bandwidth, and the second bandwidth is larger than the first bandwidth; an analog demodulation circuit configured to demodulate the analog signal of the second bandwidth to obtain an analog return signal of the first bandwidth; and a transmitting circuit, coupled to the antenna and configured to send the analog return signal of the first bandwidth to a baseband processing system, where after undergoing baseband processing, the analog return signal of the first bandwidth is sent to a core network.

As a specific implementation manner, the analog demodulation circuit is specifically configured to demodulate the analog signal of the second bandwidth to obtain multiple analog return signals of the first bandwidth, where after undergoing baseband processing, the multiple uplink analog signals of the first bandwidth are sent to the core network.

With the method for returning a base station signal, the base station, and the device in the distributed base station provided in the embodiments of the present invention, an analog signal is directly modulated/demodulated and then is sent, thereby reducing complexity of a signal returning process. Compared with the prior art, at least two times of analog-to digital conversion are reduced, thereby simplifying a signal returning processing process.

DESCRIPTION OF EMBODIMENTS

There is a prejudice in current technical implementation. A signal is returned through a digital signal in a wireless communications system. After a digital signal is applied in the field of wireless communications, it is commonly considered in the industry that a digital analog conversion module is an essential component of a base station, and optimization for a base station cannot depart from an existing base station architecture basis and system. Definitely, it is considered that it is impossible to set back a base station technology to the first generation that adopts an analog technology and a current communications demand cannot be met so that a person skilled in the art also considers that it is impossible to give up digital signal conversion.

Signal returning of a base station generally refers to a process that the base station sends back a signal from a radio remote unit (RRU) to a baseband processing unit (BBU), and signal sending between a radio remote unit and a baseband processing unit is also referred to as signal returning. A signal sent from an RRU to a BBU is generally referred to as a base station uplink signal, while a signal sent from a BBU to an RRU is referred to as a base station downlink signal. A distributed base station becomes increasingly common as networks evolve and base stations develop. In a third generation (3G) long-term evolution (LTE) technology, a base station can directly transmit a signal to a core network. Though specific implementation manners of base stations are different, a distributed base station includes a radio frequency processing part, for example, an RRU, and a baseband processing part, for example, a BBU, and signal returning between an RRU and a BBU may be similar. A signal of a base station and a network system is generally connected through a return unit. In one embodiment of the present invention, a base station analog intermediate frequency signal is directly modulated/demodulated (for example, spectrum spreading/despreading, frequency modulation/frequency demodulation, phase modulation/phase demodulation) and forwarded, On one hand, a complicated signal processing process in a conventional return solution is simplified. On the other hand, problems such as cellular frequency spectrum occupation and noise accumulation of a conventional repeater can be overcome. In the embodiments of the present invention, a base station analog uplink signal may include data information and control information. The data information is data during communications, while the control information is used to control channel communications.

Figure 1:
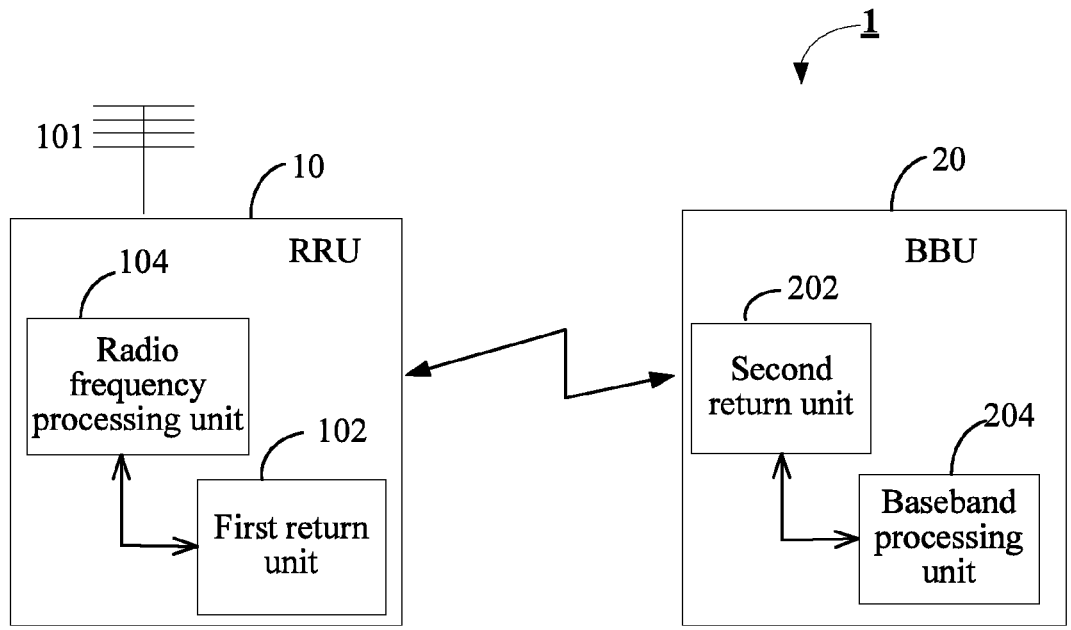
FIG. 1 is a schematic diagram of a base station according to an embodiment of the present invention.

FIG. 1 is a schematic diagram of a base station according to an embodiment of the present invention. A base station 1 includes a BBU/baseband processing system 20 and a RRU/radio frequency system 10. The radio frequency system 10 includes an antenna system 101, a radio frequency processing unit 104, and a first return unit 102. The radio frequency processing unit is configured to generate an uplink analog signal of a first bandwidth, and the first return unit 102 sends the uplink analog signal of the first bandwidth to the baseband processing system. The baseband processing system 20 includes a second return unit 202 and a baseband processing unit 204, where the second return unit 202 is configured to receive a return signal sent by the first return unit 102. The embodiment of the present invention provides a method for returning a base station signal by using an analog signal so as to provide a new technical solution for a base station signal returning process, and multiple types of technical processing may be adopted to generate a return signal and perform baseband processing on the return signal after the return signal reaches the baseband processing unit. Therefore, the accompanying drawing mainly shows a part related to returning.

The base station 1 in the embodiment of the present invention includes the first return unit 102 located in the radio frequency system 10 and the second return unit 202 located in the baseband processing system 20.

The first return unit 102 is configured to perform analog modulation on an uplink analog signal of a first bandwidth to obtain an uplink analog signal of a second bandwidth, and send the uplink analog signal of the second bandwidth to the second return unit 202, where the second bandwidth is larger than the first bandwidth;

The second return unit 202 is configured to receive the uplink analog signal of the second bandwidth, and demodulate the uplink analog signal of the second bandwidth to obtain the uplink analog signal of the first bandwidth. The baseband processing unit is configured to perform baseband processing on the uplink analog signal of the first bandwidth and send the baseband-processed uplink analog signal of the first bandwidth to a core network.

Further, when a downlink signal is sent, the second return unit 202 is further configured to modulate a downlink analog signal of a third bandwidth to obtain a downlink analog signal of a fourth bandwidth, where the downlink analog signal of the third bandwidth has been processed by the baseband processing system; send the downlink analog signal of the fourth bandwidth to the first return unit 102, where the fourth bandwidth is larger than the third bandwidth.

The first return unit is further configured to demodulate the downlink analog signal of the fourth bandwidth to obtain the downlink analog signal of the third bandwidth, and send the downlink analog signal of the third bandwidth to a user through the radio frequency system.

In a practical application, the first return unit 102 may combine multiple analog return signals of the first bandwidth into one analog signal of the second bandwidth, which can specifically be achieved through spread spectrum modulation or frequency modulation. Signal transmission between the first return unit 102 and the second return unit 202 may be performed in a manner of a wired link, for example, an optical fiber, or in a wireless manner, for example, a microwave.

Figure 2:
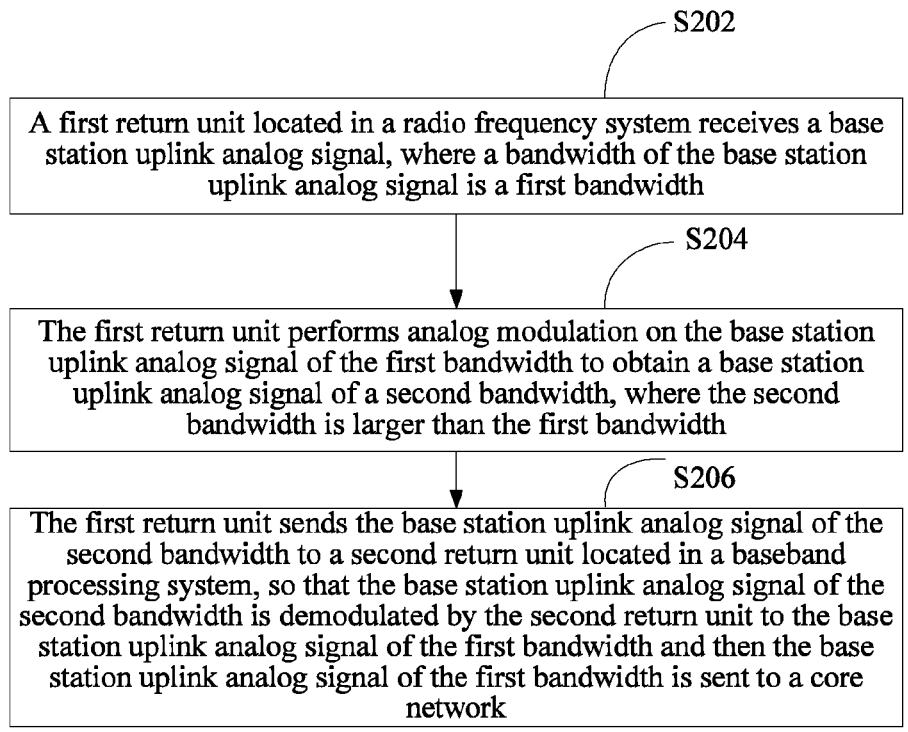
FIG. 2 is a flow chart of a method for returning a base station signal by using an analog signal according to an embodiment of the present invention.

FIG. 2 is a flow chart of a method for returning a base station signal by using an analog signal according to an embodiment of the present invention. The method is applied in a distributed base station, the base station includes a radio frequency system and a baseband processing system, and the method includes:

S202. A first return unit located in the radio frequency system receives an uplink analog signal, where a bandwidth of the uplink analog signal is a first bandwidth.

The base station communicates with a user terminal. The base station receives a signal from a calling user terminal, where the signal is a radio frequency analog signal; and the base station converts the received signal into a narrowband analog signal, which is referred to as an analog signal of the first bandwidth herein. In common implementation, the analog signal of the first bandwidth is an intermediate frequency analog signal or a baseband analog signal.

The base station modulates a narrowband intermediate frequency signal, namely, the analog signal of the first bandwidth, to a wideband intermediate frequency signal in a return system, namely, an analog signal of a second bandwidth.

S204. The first return unit performs analog modulation on the uplink analog signal of the first bandwidth to obtain an uplink analog signal of a second bandwidth, where the second bandwidth is larger than the first bandwidth.

In a modulation process, the analog modulation includes spread spectrum modulation or frequency modulation. Direct sequence spectrum spreading, for example, may be adopted for spectrum spreading. Therefore, the first bandwidth is smaller than the second bandwidth.

S206. The first return unit sends the uplink analog signal of the second bandwidth to a second return unit located in the baseband processing system so that the uplink analog signal of the second bandwidth is demodulated by the second return unit to the uplink analog signal of the first bandwidth and then the uplink analog signal of the first bandwidth is sent to a core network.

The base station directly returns a signal by using an analog signal without performing digital-to-analog conversion. In a wireless return architecture and solution designed in the embodiment of the present invention, a base station analog signal is directly modulated/demodulated and forwarded. On one hand, a complicated signal processing process in a conventional return solution is simplified and a hardware cost, a board size, power consumption, and the like are significantly reduced. On the other hand, problems such as cellular frequency spectrum occupation and noise accumulation of a conventional repeater can also be overcome to a great extent.

According to the embodiment of the present invention, on a receiving channel, after a base station radio frequency signal is down-converted into an intermediate frequency signal, analog domain modulation is directly performed at an intermediate frequency so that a base station narrowband intermediate frequency signal is modulated to a wideband intermediate frequency signal of a return system, and the wideband intermediate frequency signal is transmitted to a return peer end after undergoing up conversion of the return system. On a sending channel, after a received signal is down-converted into an analog intermediate frequency of the return system, through analog domain demodulation, a wideband analog signal is demodulated to a narrowband base station analog intermediate frequency signal, and the narrowband base station analog intermediate frequency signal undergoes processing such as up conversion and then is transmitted through a antenna system of the base station. Further, in a specific implementation process, in step S204, a specific implementation manner in a process that the base station performs spectrum spreading may be direct sequence spectrum spreading/despreading, frequency modulation/demodulation, phase modulation/phase demodulation or a combination of different modulation manners, and multiple spread spectrum codes may be used to implement parallel transmission of multiple signals (a multiple-antenna signal, a control signal, a digital pre-distortion (DPD) feedback signal, and the like).

Figure 3:
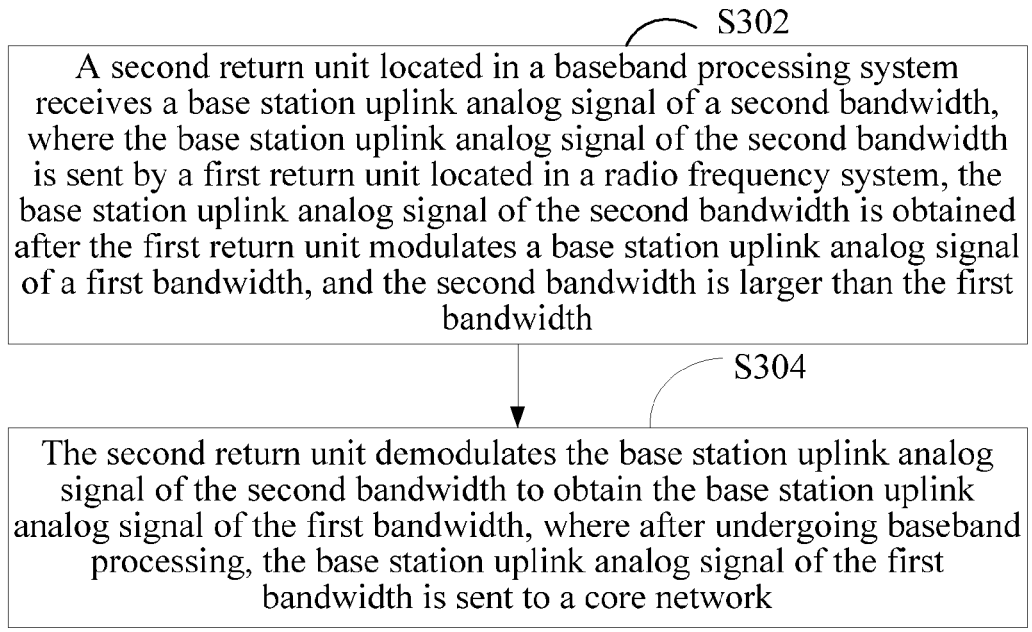
FIG. 3 is a flow chart of another method for returning a base station signal by using an analog signal according to an embodiment of the present invention.

FIG. 3 is a flow chart of another method for returning a base station signal by using an analog signal according to an embodiment of the present invention. The method is applied in a distributed base station, and in this embodiment, the base station includes a radio frequency system and a baseband processing system. The method includes:

S302. A second return unit located in the baseband processing system receives an uplink analog signal of a second bandwidth, where the uplink analog signal of the second bandwidth is sent by a first return unit located in the radio frequency system, the uplink analog signal of the second bandwidth is obtained after the first return unit modulates an uplink analog signal of a first bandwidth, and the second bandwidth is larger than the first bandwidth.

A base station uplink signal is still an analog signal and undergoes analog modulation performed by the base station or a return unit of the base station.

S304. The second return unit demodulates the uplink analog signal of the second bandwidth to obtain the uplink analog signal of the first bandwidth, where after undergoing baseband processing, the uplink analog signal of the first bandwidth is sent to a core network.

Further, in a specific implementation process, a microwave technology may be used as a specific embodiment. A microwave signal is used to return the uplink analog signal of the second bandwidth, and the base station loads the analog signal of the first bandwidth to a microwave voltage controlled oscillator, and specifically, to a voltage control end so that an amplitude change of the uplink analog signal of the first bandwidth is converted into a frequency change of the microwave signal to obtain the uplink analog signal of the second bandwidth. The base station sends the uplink analog signal of the second bandwidth to the second return unit by sending a microwave.

The base station in the system in the embodiment of the present invention directly returns a base station signal by using an analog signal without performing digital-to-analog conversion. In a wireless return architecture and solution designed in the embodiment of the present invention, a base station analog signal is directly modulated/demodulated and forwarded. On one hand, a complicated signal processing process in a conventional return solution is simplified and a hardware cost, a size, power consumption, and the like are significantly reduced. On the other hand, problems such as cellular frequency spectrum occupation and noise accumulation of a conventional repeater are overcome.

Figure 4:
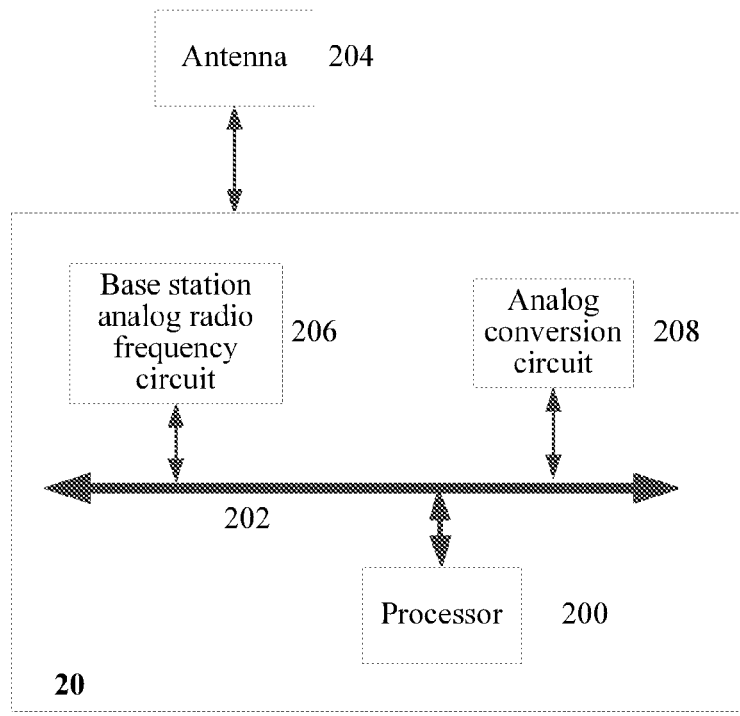
FIG. 4 is a schematic structural diagram of a radio frequency processing device according to an embodiment of the present invention.

Further, referring to FIG. 4, an embodiment of the present invention further provides a radio frequency processing device, which is usually an independent part in a distributed base station, such as a radio frequency remote unit, or may be a single signal return unit module, but in most cases should be a radio frequency remote unit. The base station device includes an antenna system 204 (equivalent to 101 in the base station shown in FIG. 1), and the antenna system 204 includes an essential transmitting circuit and receiving circuit (not shown in the figure). The antenna system 204 may be a multi-antenna system, namely, includes multiple antennas and may adopt a multi-antenna technology to transmit a signal. The radio frequency processing device also should have a processor 200 that has a basic capability to control the radio frequency processing device and process a signal, and controls each hardware module, circuit and the like through a bus processor 202. A difference from an existing common radio frequency processing device lies in that, the embodiment of the present invention further includes the first return unit 102 in the base station shown in FIG. 1. A base station analog radio frequency circuit 206 and an analog conversion circuit 208 form the first return unit, for example, the first return unit 102 in the base station shown in FIG. 1. The first return unit specifically includes: the base station analog radio frequency circuit 206, where the base station analog radio frequency circuit 206 is coupled to the antenna system 204 and receives a signal sent by a calling user terminal through the antenna system 204, and is configured to generate an uplink analog signal of a first bandwidth; and the analog conversion circuit 208, where the analog conversion circuit 208 is connected to the analog radio frequency circuit 206 (for example, in the form of a bus), and is configured to perform analog modulation on the uplink analog signal of the first bandwidth to obtain an uplink analog signal of a second bandwidth, where the second bandwidth is larger than the first bandwidth after conversion is performed by the analog conversion circuit. The analog conversion circuit is coupled to the antenna system, and the antenna system sends the analog signal of the second bandwidth to the baseband processing device, where the uplink analog signal of the second bandwidth is demodulated by the baseband processing device to the base station analog signal of the first bandwidth, and then the base station analog signal of the first bandwidth is sent to a core network.

The analog conversion circuit includes: a sampler, periodically sampling the analog signal of the first bandwidth to obtain a sampled signal; a spread spectrum sequence generator, generating a group of spread spectrum sequences, where the group of spread spectrum sequences belongs to an orthogonal spread spectrum sequence group; and a mixer, multiplying the sampled signal by the spread spectrum sequence to obtain the analog signal of the second bandwidth.

As an improved solution, a pulse shaping filter may further be included and performs spread spectrum pulse shaping filtering on the spread spectrum sequence so that a waveform is more stable and a processing effect is enhanced. In a specific method, the manner definitely can be adopted to convert the analog signal of the first bandwidth into the analog signal of the second bandwidth.

Further, as a specific implementation manner for the radio frequency processing device to perform analog modulation on the base station analog uplink signal of the first bandwidth to obtain the analog signal of the second bandwidth, in a process that the base station performs spectrum spreading, a specific implementation manner may be direct sequence spectrum spreading, and the analog conversion circuit of the base station periodically samples a signal, which may specifically, for example, maintain one symbol period. The spread spectrum sequence generator generates a group of spread spectrum sequences belonging to a certain orthogonal spread spectrum sequence group. The pulse shaping filter performs pulse shaping filtering on a spread spectrum pulse. The mixer multiplies a sampled intermediate frequency signal by a spread spectrum sequence. The uplink analog signal of the first bandwidth is converted into the uplink analog signal of the second bandwidth through the foregoing processing.

In a process that the uplink analog signal of the first bandwidth is converted into the uplink analog signal of the second bandwidth, a narrowband intermediate frequency signal first passes through a sample-and-hold circuit, a sampling clock is obtained through frequency division of a spread spectrum clock, and after passing through the mixer, a sample-and-hold signal is multiplied by the spread spectrum sequence to implement spreading so as to perform spectrum spreading on a narrowband intermediate frequency signal of the base station to obtain an analog intermediate frequency signal of a return system bandwidth for subsequent processing such as up conversion of a return system. Multiple parallel signals can be transmitted simultaneously according to a spread spectrum code length, namely, the number of sequences. In a modulation process, multiple spread spectrum codes can be adopted to implement parallel transmission of multiple signals (for example, a multi-antenna signal, a control signal, and a DPD feedback signal).

Figure 5:
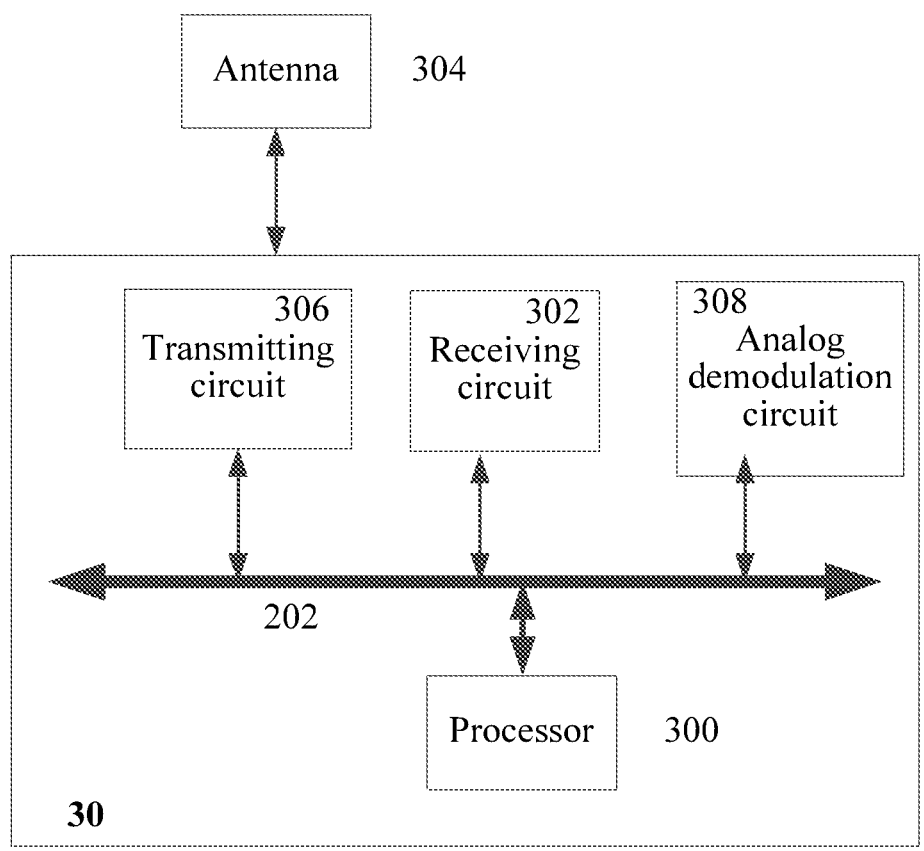
FIG. 5 is a schematic structural diagram of a baseband processing device according to an embodiment of the present invention.

Further, as a new specific embodiment, an embodiment of the present invention further provides a baseband processing device, which may be a part of a distributed base station, for example, a baseband processing unit BBU (20 of the base station shown in FIG. 1). The baseband processing device performs baseband processing on a received base station return signal (an uplink analog signal) and sends the baseband-processed signal to a core network. Referring to FIG. 5, a baseband processing device 30 includes: an analog demodulation circuit 308 configured to demodulate a received wideband analog signal to obtain a narrowband sending signal; and a transmitting circuit 306 configured to send an analog return signal of a first bandwidth to a baseband processing system, where after undergoing baseband processing, the analog return signal of the first bandwidth is sent to a core network. In addition, a processor 300 manages each circuit and module through a bus.

If returning is performed in a wireless form, a return receiving device further includes: a receiving circuit 302, where the receiving circuit 302 is coupled to an antenna system, where the antenna may also be a multi-antenna system, and is configured to receive an uplink analog signal of a second bandwidth, where the uplink analog signal of the second bandwidth is sent by a first return unit, the received uplink analog signal of the second bandwidth is obtained after the first return unit of a radio frequency processing device modulates an uplink analog signal of the first bandwidth, and the second bandwidth is larger than the first bandwidth; and an analog demodulation circuit 308 configured to demodulate the analog signal of the second bandwidth to obtain the analog return signal of the first bandwidth. The transmitting circuit 306 is coupled to an antenna 304 and is configured to send the analog return signal of the first bandwidth to a core network side. After undergoing baseband processing, the analog return signal of the first bandwidth is sent to a core network. The receiving circuit 302, the analog demodulation circuit 308, and the transmitting circuit 306 form a second return unit, for example, the second return unit 202 shown in FIG. 2. Specifically, the antenna system receives a return system analog intermediate frequency signal, a system clock is recovered through a clock recovery circuit, an integrated circuit implements an interface for the received signal through analog frequency mixing, and finally, a narrowband intermediate frequency analog signal of the base station is recovered through a sample-and-hold circuit and low-pass filtering for subsequent processing such as analog-to-digital conversion as required by a back-end base station.

As a specific implementation manner, by taking spread spectrum demodulation as an example, an embodiment of the present invention provides a structure of an analog demodulation circuit, and the analog demodulation circuit includes: a clock recovery unit, recovering a chip clock from an intermediate frequency signal that has undergone spectrum spreading, which can be implemented through multiple technologies; a spread spectrum sequence generator, generating a group of spread spectrum sequences belonging to a certain orthogonal spread spectrum sequence group; a synchronization code searcher configured to obtain a symbol start position through search, which can be implemented through multiple technologies, for example, a charge-coupled device (CCD) chip correlator; a mixer, multiplying a sampled intermediate frequency signal by the spread spectrum sequence; a pulse shaping filter configured to perform pulse shaping filtering on a spread spectrum code; an integrator configured to accumulate signals in a symbol period to implement signal despreading; a sample-and-hold circuit configured to sample a signal that has undergone despreading; and a low-pass filter, performing filtering on the sampled signal to filter out a high frequency component to recover a narrowband intermediate frequency signal that has undergone despreading.

Returning in an LTE system of a 20 megahertz (MHz) bandwidth is taken as a specific design example in the following to introduce the embodiment of the present invention with reference to a specific signal parameter.

To completely offset noise accumulation of a returning channel (E-BAND and V-BAND link noise factors are 9-11 decibels (dB)), a selected length of a spread spectrum may be larger than 16 bit (a spread spectrum gain is 12 dB), for example, 16 bit, 32 bit, 64 bit, and 128 bit. When a bandwidth of a baseband processing system is 20 MHz, and a sample-and-hold clock selects a bandwidth larger than 40 MHz, for example, selects 61.44 MHz, a requirement of a sampling rule is satisfied. 16 times spectrum spreading is selected for spectrum spreading, and any one sequence is selected (supporting superposition of 16 spread spectrum signals, simultaneous transmission of multiple analog intermediate frequency signals, and a power amplification DPD feedback channel signal of a base station, and the like). A spread spectrum clock selects 491.52 MHz, and a returning analog intermediate frequency bandwidth is selected as 491.52 MHz (<500 MHz, E-Band frequency band is selected as two 250 MHz bandwidths). In an analog domain spread spectrum modulation and demodulation process, a relationship between a modulating signal and a modulated signal satisfies the following formula:

$$M(t) = \sum_{n=0}^{N} s_n(t) \times p_n(t).$$

In the formula, M(t) represents a modulation output signal; $s_n(t)$ represents an $n^{th}$ modulated signal, where the signal changes with time t; $p_n(t)$ represents an $n^{th}$ group in a group of orthogonal sequences, where a length of the sequence is set to R, and a bit rate of the signal is more than 2R times of a bandwidth of the modulated signal $s_n(t)$; and in the formula, N is a positive integer larger than or equal to 0 and smaller than R.

In the foregoing embodiments, if a microwave is specifically adopted to implement returning of a base station signal, a base station loads an analog signal of a first bandwidth (namely, a narrowband) to a microwave voltage controlled oscillator so that an amplitude change of the analog signal of the first bandwidth is converted into a frequency change of a microwave signal to implement modulation so as to obtain an analog signal of a second bandwidth (namely, a wideband). In analog domain frequency modulation, a base station analog intermediate frequency signal is directly loaded to a voltage control end of the microwave voltage controlled oscillator so that an amplitude change of the base station analog intermediate frequency signal is directly converted into a frequency change of a microwave signal to implement modulation. When amplitude noise interference is reduced through a limiter for a signal received from a microwave link, demodulation of a frequency-modulated signal is implemented through a Foster-Seeley discriminator so as to obtain the base station analog intermediate frequency signal. A frequency offset of a modulated and output signal is in an increasing function or decreasing function relation with amplitude of a modulated signal.

An embodiment in which analog domain orthogonal phase modulation is adopted is shown in FIG. 6. After being sampled by a multiple time division sample-and-hold circuits, N analog I/Q signals of a base station and one pilot signal form orthogonal component signals whose bandwidth is 2×N times as large as that of the original I/Q signals of the base station, and the signals form a modulated microwave signal for outputting after the signals undergo modulation of a microwave up conversion orthogonal modulator. A block diagram of a principle of analog domain orthogonal phase modulation and demodulation is shown in FIG. 7. In the figure, a microwave signal is divided into I and Q orthogonal components after undergoing orthogonal demodulation, and a pilot search circuit finds a branch where a specified pilot component is located among output branches, and adjusts a sampling timing clock to enable the pilot component to be on a correct output branch so that multiple time division sample-and-hold sequences are synchronized with a sending end.

The technical solutions of the present application are described in detail from the perspective of implementation of a base station system, method, and device in the foregoing embodiments of the present invention. A device in a base station application device embodiment works by adopting the methods and procedures in the foregoing method embodiments, and steps and implementation manners in the method embodiments may be implemented by the device or the base station. The base station and the device may be applied for specific processing of the method. Similarly, the base station and the device are also configured to implement steps and procedures in the method. Therefore, the method is a method adopted by the introduced base station and device to work.

In an embodiment of the present invention, a base station analog intermediate frequency signal is directly modulated/demodulated (for example, spectrum spreading/despreading, and frequency modulation/frequency demodulation) and forwarded. On one hand, a complicated signal processing process in a conventional microwave return solution is simplified. On the other hand, problems such as cellular frequency spectrum occupation and noise accumulation of a conventional repeater can also be overcome.

What is claimed is:

1. A distributed base station, comprising: a radio frequency system comprising a radio frequency processing unit and a first return unit; and a baseband processing system comprising a baseband processing unit and a second return unit, wherein the radio frequency processing unit is configured to generate an uplink analog signal of a first bandwidth, wherein the first return unit is configured to: perform analog modulation on the uplink analog signal of the first bandwidth generated by the radio frequency processing unit; obtain an uplink analog signal of a second bandwidth; and send the uplink analog signal of the second bandwidth to the second return unit, wherein the second bandwidth is larger than the first bandwidth, wherein the second return unit is configured to: receive the uplink analog signal of the second bandwidth sent by the first return unit; and demodulate the uplink analog signal of the second bandwidth to obtain the uplink analog signal of the first bandwidth, and wherein the baseband processing unit is configured to: perform baseband processing on the uplink analog signal of the first bandwidth; and send the baseband-processed uplink analog signal of the first bandwidth to a core network;

wherein the first return unit comprises a microwave voltage controlled oscillator, and wherein the first return unit is further configured to: perform analog modulation on the uplink analog signal of the first bandwidth to obtain the uplink analog signal of the second bandwidth; convert an amplitude change of the uplink analog signal of the first bandwidth into a microwave signal through the microwave voltage controlled oscillator; and send the uplink analog signal of the second bandwidth to the second return unit through the microwave signal.

2. The distributed base station according to claim 1, wherein the baseband processing unit is further configured to generate a downlink analog signal of a third bandwidth, wherein the second return unit is further configured to:

modulate the downlink analog signal of the third bandwidth generated by the baseband processing unit;

obtain a downlink analog signal of a fourth bandwidth; and send the downlink analog signal of the fourth bandwidth to the first return unit, wherein the fourth bandwidth is larger than the third bandwidth, and wherein the first return unit is further configured to:

demodulate the downlink analog signal of the fourth bandwidth to obtain the downlink analog signal of the third bandwidth; and transmit the downlink analog signal of the third bandwidth to the radio frequency processing unit.

3. The distributed base station according to claim 1, wherein the first return unit is further configured to:

perform analog modulation on one or multiple uplink analog signals of the first bandwidth to obtain one uplink analog signal of the second bandwidth; and send the one uplink analog signal of the second bandwidth to the second return unit, and wherein the second return unit is configured to:

receive the one uplink analog signal of the second bandwidth; and demodulate the one uplink analog signal of the second bandwidth to obtain the one or multiple uplink analog signals of the first bandwidth.

4. The distributed base station according to claim 3, wherein the first return unit is further configured to:
perform spread spectrum analog modulation, frequency modulation, or phase modulation on the multiple uplink analog signals of the first bandwidth to obtain the one uplink analog signal of the second bandwidth; and
send the one uplink analog signal of the second bandwidth to the second return unit, and
wherein the second return unit is configured to:
receive the one uplink analog signal of the second bandwidth, and
perform spread spectrum demodulation, frequency demodulation, or phase demodulation on the one base station analog signal of the second bandwidth to obtain the one or multiple uplink analog signals of the first bandwidth.

5. The distributed base station according to claim 1, wherein the first return unit is further configured to:
perform analog modulation on the uplink analog signal of the first bandwidth to obtain one uplink analog signal of the second bandwidth; and
send the uplink analog signal of the second bandwidth to the second return unit through a wireless signal.

6. The distributed base station according to claim 1, wherein the first return unit is further configured to:
perform analog modulation on the uplink analog signal of the first bandwidth to obtain one uplink analog signal of the second bandwidth; and
send the uplink analog signal of the second bandwidth to the second return unit through a wired link.

7. A method for returning a base station signal by using an analog signal, wherein the method is applicable to a distributed base station, wherein the base station comprises a radio frequency system and a baseband processing system, and wherein the method comprises: receiving, by a first return unit located in the radio frequency system, an uplink analog signal, wherein a bandwidth of the uplink analog signal is a first bandwidth; performing, by the first return unit, analog modulation on the uplink analog signal of the first bandwidth to obtain an uplink analog signal of a second bandwidth, wherein the second bandwidth is larger than the first bandwidth; and sending, by the first return unit, the uplink analog signal of the second bandwidth to a second return unit located in the baseband processing system so that the uplink analog signal of the second bandwidth is demodulated by the second return unit to the uplink analog signal of the first bandwidth, wherein the uplink analog signal of the first bandwidth is subsequently sent to a core network;
wherein performing, by the first return unit, the analog modulation on the uplink analog signal of the first bandwidth to obtain the uplink analog signal of the second bandwidth comprises: performing, by the first return unit, spread spectrum modulation on the uplink analog signal of the first bandwidth to obtain the uplink analog signal of the second bandwidth; performing, by the first return unit, frequency modulation on the uplink analog signal of the first bandwidth to obtain the uplink analog signal of the second bandwidth; performing, by the first return unit, phase modulation on the uplink analog signal of the first bandwidth to obtain the uplink analog signal of the second bandwidth; or performing, by the first return unit, modulation on the uplink analog signal of the first bandwidth by adopting a modulation method of combining spread spectrum modulation, frequency modulation, and phase modulation, to obtain the analog signal of the second bandwidth.

8. The method according to claim 7, wherein performing, by the first return unit, the analog modulation on the uplink analog signal of the first bandwidth to obtain the uplink analog signal of the second bandwidth comprises performing, by the first return unit, analog modulation on one or multiple uplink analog signals of the first bandwidth to obtain one uplink analog signal of the second bandwidth.

9. The method according to claim 7, wherein the uplink analog signal is an intermediate frequency analog signal or baseband analog signal, and wherein performing, by the first return unit, the analog modulation on the uplink analog signal of the first bandwidth to obtain the analog signal of the second bandwidth comprises performing, by the first return unit, analog modulation on the intermediate frequency or baseband analog signal of the first bandwidth to obtain an intermediate frequency or baseband analog signal of the second bandwidth.

10. The method according to claim 7, wherein sending, by the first return unit, the uplink analog signal of the second bandwidth to the second return unit comprises sending, by the first return unit, the uplink analog signal of the second bandwidth to the second return unit by adopting a microwave signal.

11. The method according to claim 7, wherein performing, by the first return unit, the spread spectrum modulation on the uplink analog signal of the first bandwidth to obtain the uplink analog signal of the second bandwidth comprises performing, by the first return unit, direct sequence spread spectrum modulation on the uplink analog signal of the first bandwidth to obtain the uplink analog signal of the second bandwidth.

12. The method according to claim 7, wherein performing, by the first return unit, the analog modulation on the uplink analog signal of the first bandwidth to obtain the uplink analog signal of a second bandwidth comprises performing, by the first return unit, analog modulation on one or multiple uplink analog signals of the first bandwidth to obtain one uplink analog signal of the second bandwidth, and wherein sending, by the first return unit, the uplink analog signal of the second bandwidth to the second return unit located in the baseband processing system comprises sending, by the first return unit, the one uplink analog signal of the second bandwidth to the second return unit located in the base station processing system so that the one uplink analog signal of the second bandwidth is demodulated by the second return unit to the one or multiple uplink analog signals of the first bandwidth and then the one or multiple uplink analog signals of the first bandwidth are sent to the core network.

13. The method according to claim 7, wherein performing, by the first return unit, analog modulation on the uplink analog signal of the first bandwidth to obtain an uplink analog signal of a second bandwidth comprises converting, by the first return unit, an amplitude change of the uplink analog signal of the first bandwidth into a microwave signal, and wherein sending, by the first return unit, the uplink analog signal of the second bandwidth to the second return unit located in the baseband processing system comprises sending, by the first return unit through the microwave signal, the uplink analog signal of the second bandwidth to the second return unit located in the baseband processing system.

14. The method according to claim 7, wherein performing, by the first return unit, the analog modulation on the uplink analog signal of the first bandwidth to obtain the uplink analog signal of a second bandwidth comprises:

sampling, by the first return unit, the uplink analog signal of the first bandwidth to obtain a sampling-retaining signal, wherein a sampling clock is obtained through frequency division of a spread spectrum clock; and multiplying the sampling-retaining signal by a spread spectrum sequence to implement spreading to obtain the analog signal of the second bandwidth, wherein the sampling-retaining signal has undergone frequency mixing.

15. The method according to claim 7, wherein the uplink analog signal of the first bandwidth comprises data information and control information.

16. A radio frequency processing device of a distributed base station, comprising: an antenna system; and a base station analog radio frequency circuit configured to generate an uplink analog signal of a first bandwidth; and an analog conversion circuit connected to the analog radio frequency circuit and configured to perform analog modulation on the uplink analog signal of the first bandwidth to obtain an uplink analog signal of a second bandwidth, wherein the second bandwidth is larger than the first bandwidth after conversion is performed by the analog conversion circuit, wherein the analog conversion circuit is coupled to the antenna system, wherein the antenna system is configured to send the analog signal of the second bandwidth to a baseband processing device, and wherein the uplink analog signal of the second bandwidth is demodulated by the baseband processing device to the base station analog signal of the first bandwidth and then the base station analog signal of the first bandwidth is sent to a core network;

wherein the analog conversion circuit comprises: a sampler configured to periodically sample the uplink analog signal of the first bandwidth to obtain a sampled signal; a spread spectrum sequence generator configured to generate a group of spread spectrum sequences, wherein the group of spread spectrum sequences belongs to an orthogonal spread spectrum sequence group; and a mixer configured to multiplying the sampled signal by the spread spectrum sequence to obtain the uplink analog signal of the second bandwidth.

17. The radio frequency processing device according to claim 16, wherein the analog radio frequency circuit comprises a frequency conversion module, wherein the frequency conversion module is configured to down-convert a signal received through the antenna system to obtain an intermediate frequency or baseband analog signal, and wherein the uplink analog signal of the first bandwidth is an intermediate frequency or baseband analog signal of the first bandwidth.

* * * * *